(12) United States Patent
Hazucha et al.

(10) Patent No.: US 6,995,605 B2
(45) Date of Patent: Feb. 7, 2006

(54) RESONANCE SUPPRESSION CIRCUIT

(75) Inventors: Peter Hazucha, Beaverton, OR (US);
Jianping Xu, Portland, OR (US);
Gerhard Schrom, Hillsboro, OR (US);
Tanay Karnik, Portland, OR (US);
Fabrice Paillet, Hillsboro, OR (US);
Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/813,169

(22) Filed: Mar. 31, 2004

(65) Prior Publication Data

US 2005/0218972 A1 Oct. 6, 2005

(51) Int. Cl.
*H03K 5/00* (2006.01)

(52) U.S. Cl. ............... 327/551; 327/311; 327/557; 307/127

(58) Field of Classification Search ........... 327/331, 327/551–559; 307/127
See application file for complete search history.

(56) References Cited

U.S. PATENT DOCUMENTS

| | | | | |
|---|---|---|---|---|
| 4,402,030 A | * | 8/1983 | Moser et al. ........ | 361/94 |
| 4,961,643 A | * | 10/1990 | Sakai et al. ........ | 356/28 |
| 5,751,184 A | * | 5/1998 | Shou et al. ........ | 327/552 |

| | | | | |
|---|---|---|---|---|
| 2004/0124715 A1 | * | 7/2004 | Huang et al. ........ | 307/127 |

FOREIGN PATENT DOCUMENTS

JP 360046692 * 3/1985

OTHER PUBLICATIONS

Patrik Larsson, Resonance and Damping in CMOS Circuits with On-Chip Decoupling Capacitance;: IEEE Transactions on Circuits and Systems—I: Fundamental Theory and Applications, vol. 45, No. 8, Aug. 1998; pp. 849-858.
Luca Amoroso et al., "Single Shot Transient Suppressor (SSTS) for High Current High Slew Rate Microprocessor;" 1999 IEEE; pp. 284-288.
Michael Ang et al.; "WP 26.7 An On-Chip Voltage Regulator Using Switched Decoupling Capacitors" 2000 IEEE International Solid-State Circuits Conference; pp. 438-439.

* cited by examiner

*Primary Examiner*—Dinh T. Le
(74) *Attorney, Agent, or Firm*—Fleshner & Kim, LLP

(57) ABSTRACT

A resonance suppression circuit is provided to suppress resonance on a power grid of a chip or die. The resonance suppression circuit may include a band-pass filter portion, a comparator portion, an amplification portion and a current dissipation portion. The band-pass filter portion may include an inverter coupled between two signal lines of the power grid. The comparator portion may sense voltage fluctuations at approximately the resonance frequency and trigger the current dissipation portion to turn ON and thereby change the frequency spectrum of the load current on the power grid to suppress the power grid resonance.

19 Claims, 3 Drawing Sheets

RESONANCE SUPPRESSION CIRCUIT

FIELD

Embodiments of the present invention may relate to a circuit to reduce or suppress resonance of a power grid on a chip, for example.

BACKGROUND

Processors may include a large number of transistors and other components interconnected on a common die (chip). The processor may be mounted on a substrate forming a package. The package may be subsequently mounted on a printed circuit board or motherboard for further installation in an electronic system. Designers may strive to increase operating frequencies (e.g., clocking speeds) of the processor. However, as the speed of the processors increases, the power consumption tends to increase.

The effectiveness of a processor may be a function of the efficient utilization of power. The effective power supply voltage applied to a processor's components may be reduced by power grid resonance. As the power grid resonance increases, the processor effectiveness may decrease. A lower effective power supply may consequently limit the attainable operating speed of the processor.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION

Figure 1:
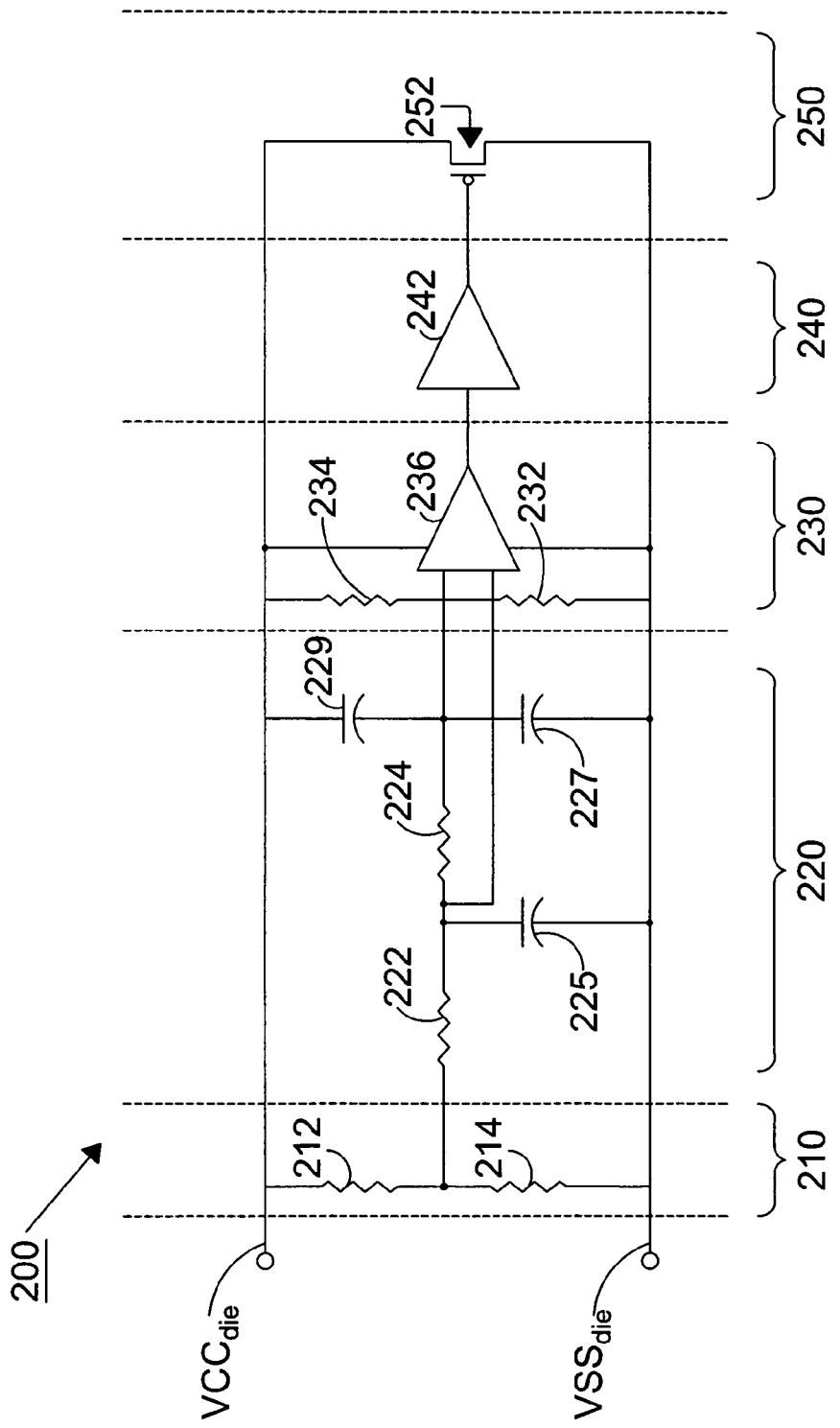
FIG. 1 is a circuit diagram of a resonant reduction circuit according to an example arrangement.

In the following detailed description, like reference numerals and characters may be used to designate identical, corresponding or similar components in differing figure drawings. Further, in the detailed description to follow, example sizes/models/values/ranges may be given although embodiments of the present invention are not limited to the same. Well-known power/ground connections to integrated circuits (ICs) and other components may not be shown within the FIGS. for simplicity of illustration and discussion. Further, arrangements and embodiments may be shown in block diagram form in order to avoid obscuring the invention, and also in view of the fact that specifics with respect to implementation of such block diagram arrangements may be dependent upon the platform within which the present invention is to be implemented. That is, the specifics may be well within the purview of one skilled in the art. Where specific details are set forth in order to describe example embodiments of the invention, it should be apparent to one skilled in the art that embodiments of the present invention can be practiced without these specific details.

Resonance is particularly a problem on a power grid of a die (or chip). For example, the RLC of a power grid, package, decoupling capacitors, switched and non-switched circuits may form a multiple resonant system. Among all these resonances, the most dominated may be the resonance that arises from the package inductances with on-die decoupling capacitance. Resonance of the power grid may be detrimental by causing unwanted sustained and transient oscillations, which in turn may cause noise, signal distortion, performance degradation, and even device damage. The power grid resonance at the resonant frequency may introduce substantial voltage fluctuation to the on-die power grids, which results in a degraded circuit performance or that causes a circuit failure due to damage to gate oxides. Die operating frequencies are increasing while power resonant frequencies are not changing appreciably. Therefore, there may be a greater probability for a programmable microprocessor to operate in a zone that modulates the power grid at its respective resonant frequency. The effects of power grid resonance may be progressively worsening as higher frequencies are generated.

To decrease the power grid resonance, example arrangements may increase the on-die decoupling capacitance. However, to effectively limit the power grid resonance, an undesirable amount of on-die decoupling capacitance may be required to limit the power grid resonance amplitude since that amount of on-die decoupling capacitance comes with significant amounts of gate leakage current. If the leakage current is too great, the power supply is very inefficient and a cost to suppress the power grid resonance is too high.

For a larger and slower processor, gate leakage may not be as much a concern as with a faster and smaller processor requiring increased power. The large number of capacitors that may be required in this type of arrangement may lead to an amount of leakage current introduced into the system that decreases the system effectiveness below an acceptable margin. The available real estate for these capacitors decreases as the requirement for the number of capacitors increases. Consequently, power consumption may be limited by such passive capacitors.

Additionally, the power grid resonance may also be reduced by an on-die switched capacitance circuit that lessens the required amount of on-die decoupling capacitance. However, such an arrangement may still require significant amounts of capacitance with negative impact on both the available die area and the leakage current. Further, such a disadvantageous switched capacitor circuit arrangement may not substantially dissipate energy at a frequency to effectively reduce the impact of such a resonance power supply voltage.

The power grid resonance may also be decreased by increasing a series resistance of the power grid. The power grid resistance dissipates energy transferred between the package inductor and the on-die decoupling capacitors during the oscillations and dampens the voltage fluctuation. However, increased series resistance on the power grid may lead to large resistive voltage (IR) drop, i.e., increased power supply droops, and lowers maximum frequency and total processing power.

Another approach to reduce resonance is band-limited active damping. Band-limited active damping may not require any additional capacitance and may consume a small die area. Little power may be consumed without the presence of resonance. Power consumption during resonance suppression may be comparable to power injected by the load around the resonance frequency. The following will relate to a band-active active damping approach.

FIG. 1 is a circuit diagram of a resonance reduction circuit (RRC) 200 according to an example arrangement. Other configurations and arrangements are also possible. As shown, the RRC 200 includes bias circuit 210, band-pass filter 220, sensing circuit 230, 3-stage buffer 240, and current generator 250. The bias circuit 210 may include resistors 212 and 214. The band-pass filter 220 may include resistors 222 and 224 and capacitors 225, 227 and 229 that are appropriately chosen so the band-pass filter 220 operates at the resonant frequency $$f_{reson} = \frac{1}{2\pi\sqrt{LC}}.$$

The resistors 222 and 224 form a resistive divider and the capacitors 229 and 227 form a capacitive divider. The sensing circuit 230 includes comparator 236 and resistors 232 and 234. The resistors 232 and 234 form a resistive divider. The buffer 240 includes comparator 242 and current generator 250 includes PMOS transistor 252.

In order to operate properly, at low frequency, a ratio of the resistors 212 and 214 has to match a ratio of the resistors 232 and 234 (other than a small intentional offset). On the other hand, to achieve rejection at a high frequency, a ratio of the capacitors 229 and 227 (i.e., the resistive divider) has to match a ratio of the resistors 234 and 232 (i.e., the resistive divider). Therefore, the RRC 200 may not tolerate process variations very well. Even with good matching of the elements, the band-pass filter 220 may not provide a high-enough rejection in a stop-band and a Q-factor of band-pass filter 220 may be relatively low.

Embodiments of the present invention may include a band-pass filter that achieves a high gain in a pass-band and a large rejection in a stop-band. For example, the band-pass filter 220 may not have a matching requirement as in the RRC 200 shown and discussed with respect to FIG. 1. Embodiments of the present invention may provide a Resonance Suppression Circuit (RSC) in CMOS technology for efficient power grid resonance suppression. The circuit may be robust, effective, and power-efficient.

Figure 2:
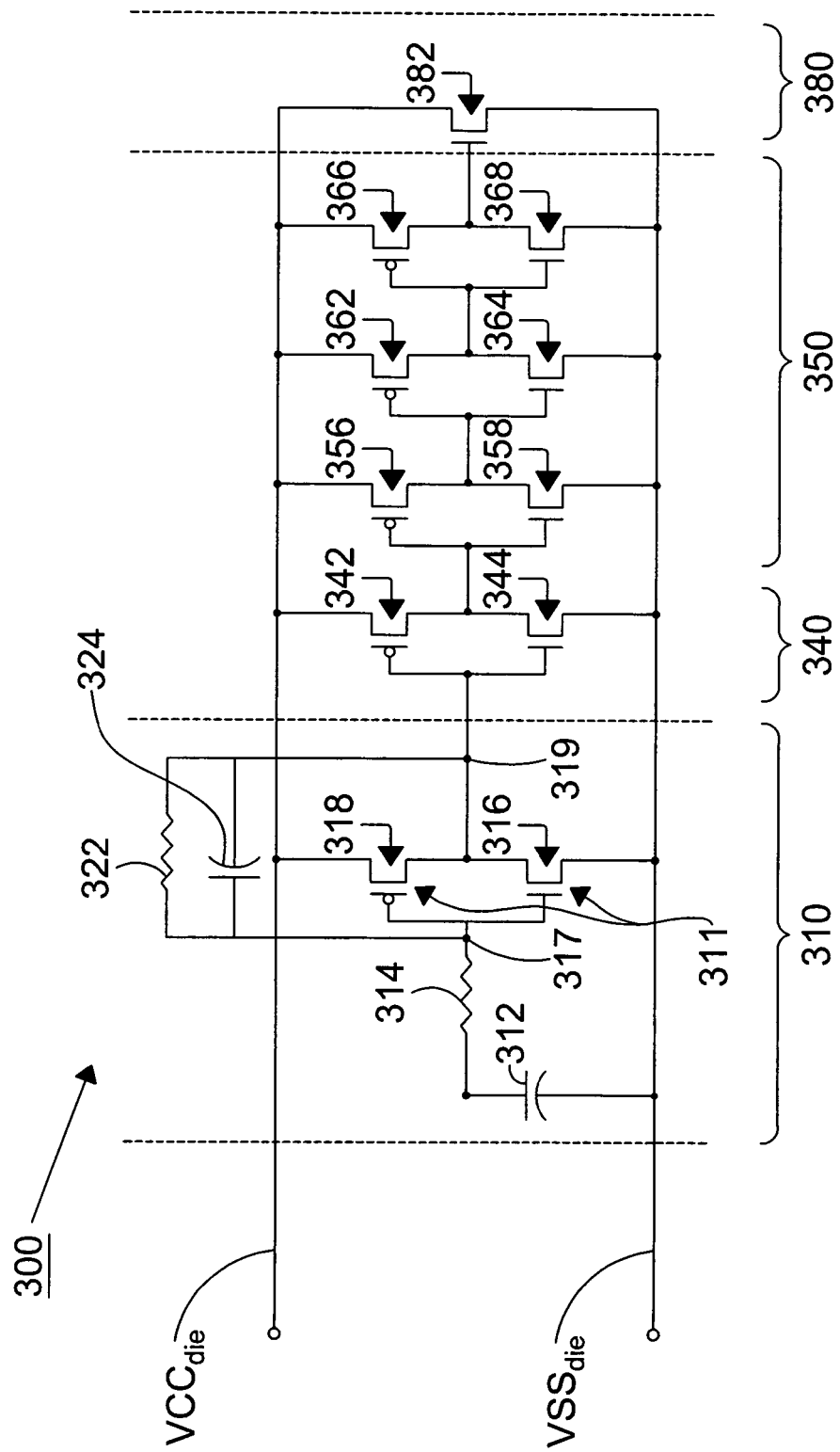
FIG. 2 is a circuit diagram of a resonant suppression circuit according to an example embodiment of the present invention.

FIG. 2 is a circuit diagram of RSC 300 according to an example embodiment of the present invention. Other embodiments and configurations are also within the scope of the present invention. More specifically, the RSC 300 may include band-pass filter 310, comparator 340, n-stage buffer (or amplification stage) 350, and current generator 380 (or current dissipation device). The RSC 300 may be provided once or multiple times along the power supply grid. The RSC 300 operates to filter and sense the resonance existence generated by a load current and to change a frequency of the load current by actively dissipating current from the power supply.

The band-pass filter 310 may include resistors 314 and 322, capacitors 312 and 324 and transistors 316 and 318. The transistors 316 and 318 may be electrically coupled between VCC and VSS and operate as an operational amplifier (shown collectively as element 311). The comparator 340 may include transistors 342 and 344 electrically coupled between VCC and VSS. The comparator 340 operates to sense if the detected resonance signals are above a certain threshold, which is set by the difference of the trip points of the operational amplifier and the comparator 340.

The buffer 350 (or amplification stage) may include a plurality of inverters electrically coupled between VCC and VSS, where each inverter is represented by a p-type transistor coupled between VCC and an n-type transistor. The n-type transistor is thereby coupled between the p-type transistor and VSS. For example, the buffer 350 may include transistors 356, 358, 362, 364, 366 and 368. Other numbers of stages of the buffer 350 are also within the scope of the present invention.

The current generator 380 may include transistor 382 electrically coupled between VCC and VSS that acts as a voltage clamp (or regulator to the power supply). The transistor 382 may be NMOS or PMOS, for example. The transistor 382 may be called a dump transistor or current dissipation device. When turned ON, the transistor 382 draws current to suppress the resonance. That is, when turned ON, the transistor 382 draws current and thereby changes a frequency (or spectrum) of a load current on the die. The transistor 382 accordingly attenuates the voltage fluctuation of the supply voltage to suppress (or reduce) the resonance.

The band-pass filter 310 includes resistors 314 and 322, capacitors 312 and 324, and transistors 318 and 316 (i.e., an inverter) that act as an operational amplifier with a virtual ground being set to a trip point of the inverter. The band-pass filter 310 detects components of resonance. To operate, at very low frequencies (i.e., DC power), capacitors 312 and 324 act as opens, resistor 322 shorts input-node 317 and output-node 319 of the inverter (i.e., the transistors 318/316) and a filter gain is zero. On the other hand, at very high frequencies, capacitor 324 shorts the input-node 317 and the output-node 319 of the inverter and the filter gain is zero. At intermediate frequencies, the filter gain may be set by a ratio of an impedance of resistor 322 in parallel with capacitor 324 and an impedance of resistor 314 in series with capacitor 312. Generally speaking, capacitor 312 accomplishes high-pass filtering and capacitor 324 accomplishes low-pass filtering. As such, band-pass filter 310 is able to pass frequencies relating to the resonance and reject other signals outside the resonance frequencies effectively.

The band-pass filter 310 may be sized for high gain in the pass band centered around the power grid resonance frequency. For good rejection in the stop band, the input of band-pass filter 310 senses the supply noise coupled to VSS. Filtered supply noise may be fed to comparator 340 (formed by transistors 342 and 344 acting as an inverter). The comparator level is a difference between the trip points of the transistors 318/316 and the transistors 342/344, and may be set to 10–20 mV, for example. When the supply voltage fluctuates at a frequency close to the grid resonance, the comparator 340 triggers the n-stage buffer 350 and generator 380. Accordingly, comparator 340 senses the resonant frequency and triggers current generator 380.

The buffer 350 delays a trigger signal so that the current generator 380 turns ON as the grid voltage approaches its peak value. The buffer 350 also amplifies the trigger signal to drive an input capacitance of the current generator 380.

Effectively, the current generator 380 acts as a voltage clamp (or a regulator to power supply). The current generator 380 accordingly draws current to change a frequency spectrum of the load current. Stated differently, the current generator 380 changes the frequency of the load current when the transistor 382 is turned ON (based on the sensed resonance frequency).

The number of buffer stages and polarity of the comparator level are such that current generator 380 is OFF when there is no resonance on the power grid. The dissipation current caused by current generator 380 being turned ON adds to the load current so that the frequency spectrum of the total current contains less energy around the resonance. By this active dumping approach, the voltage fluctuation may be greatly reduced.

Figure 3:
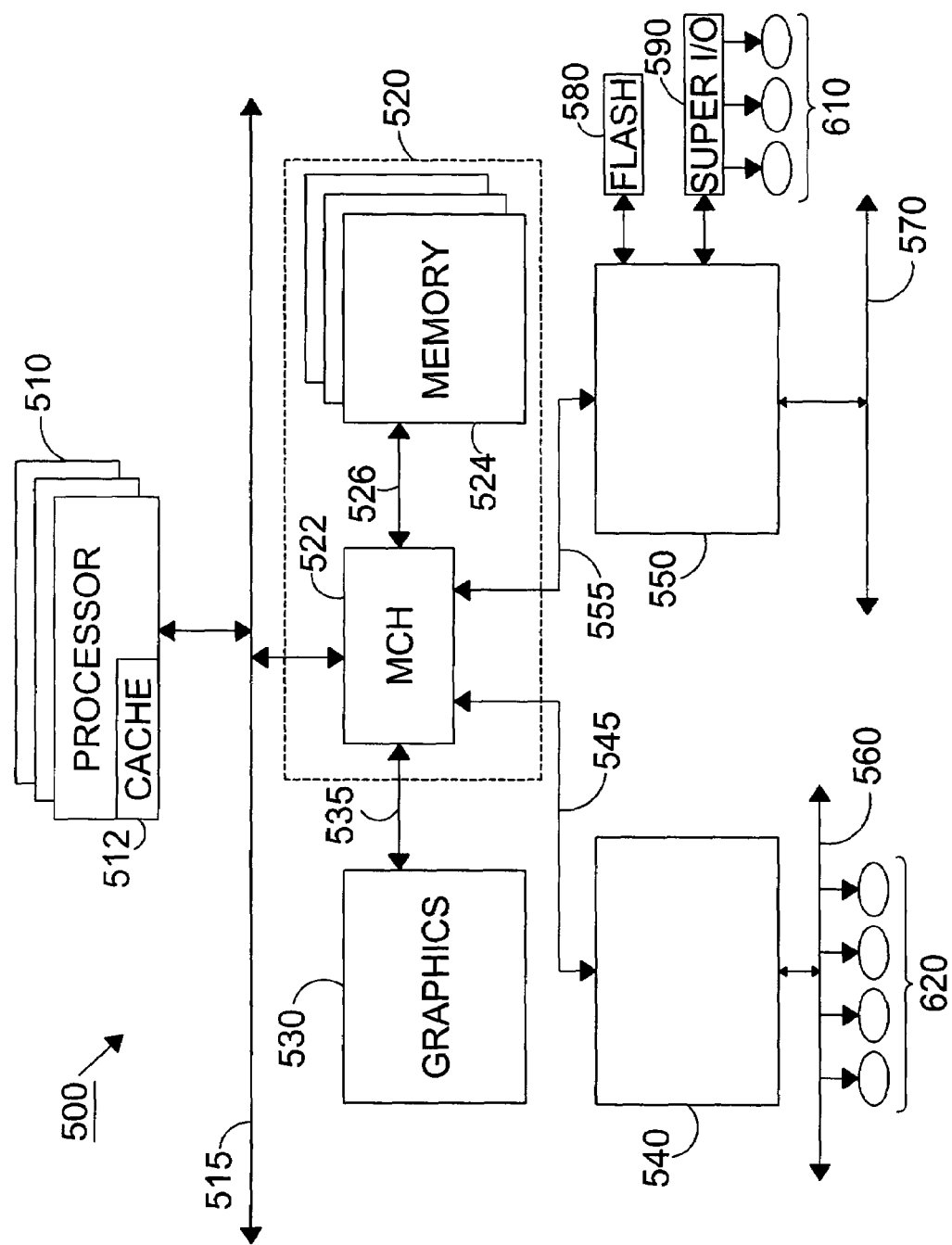
FIG. 3 is a block diagram of a computer system according to an example embodiment of the present invention.

FIG. 3 is a block diagram of an example computer system that may include embodiments of the present invention as described above. Other computer systems or other types of systems and/or platforms are also within the scope of the present invention. As shown in FIG. 3, the computer system 500 may include a processor subsystem 510, a memory subsystem 520 coupled to the processor subsystem 510 by a front side bus 515, graphics 530 coupled to the memory subsystem 520 by a graphics bus 535, one or more host chipsets (labeled 540-550) coupled to the memory subsystem 520 by hub links 545 and 555 for providing an interface with peripheral buses such as Peripheral Component Interconnect (PCI) buses 560 and 570 of different bandwidths and operating speeds, a flash memory 580, and a super I/O 590 coupled to the chipset 550 by a low pin count (LPC) bus for providing an interface with a plurality of I/O devices 610 such as a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A plurality of I/O devices 620 may be provided along the PCI bus 560. The computer system 500 may be configured differently or employ some or different components than those shown in FIG. 3.

The processor subsystem 510 may include a plurality of host processors and a cache subsystem 512. The memory subsystem 520 may include a memory controller hub (MCH) 522 coupled to the host processors by the front side bus 515 (i.e., host or processor bus) and at least one memory element 524 coupled to the MCH 522 by a memory bus 526. The memory element 524 may be a dynamic random-access-memory (DRAM), or may be a read-only-memory (ROM), video random-access-memory (VRAM) and the like. The memory element 524 stores information and instructions for use by the host processors. The graphics 520 may be coupled to the main controller hub 522 of the memory subsystem 520 by graphics bus 535, and may include, for example, a graphics controller, a local memory and a display device (e.g., cathode ray tube, liquid crystal display, flat panel display, etc.). The RSC circuit 300 as described above may be provided within the computer system 500 such as within one of the chipsets provided in the system.

Embodiments of the present invention may be provided within various electronic systems. Examples of represented systems may include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A resonance suppression circuit comprising:
   a band-pass filter portion to pass signals associated with a resonance frequency, the band-pass filter portion including an operational amplifier;
   a comparator portion, coupled to the band-pass filter portion, to sense voltage fluctuation at approximately the resonant frequency; and
   a current dissipation portion, coupled to the band-pass filter portion and coupled to receive a supply voltage, the current dissipation portion to clamp the supply voltage based on the signals passing through the band-pass filter portion.

2. The resonance suppression circuit of claim 1, further comprising an amplification portion coupled between the comparator portion and the current dissipation portion, the amplification portion to receive a trigger signal from the comparator portion and to delay turning ON the current dissipation portion.

3. The resonance suppression circuit of claim 2, wherein the comparator portion and the amplification portion operate such that the current dissipation portion is OFF when there is substantially no noise on a power grid coupled to the resonance suppression circuit.

4. The resonance suppression circuit of claim 1, wherein the current dissipation portion comprises a MOS transistor.

5. The resonance suppression circuit of claim 1, wherein the band-pass filter portion comprises a resistor and a capacitor coupled in parallel with the operational amplifier such that the resistor and the capacitor are coupled to both an input of the operational amplifier and to an output of the operational amplifier.

6. The resonance suppression circuit of claim 1, wherein the band-pass filter portion comprises a resistor and a capacitor coupled in series to an input of the operational amplifier.

7. The resonance suppression circuit of claim 1, wherein the band-pass filter portion comprises a first resistor, a second resistor, a first capacitor and a second capacitor, and a filter gain of the band-pass filter portion is based on a ratio of impedance of the first resistor and the first capacitor and an impedance of the second resistor and the second capacitor.

8. The resonance suppression circuit of claim 7, wherein the first resistor and the first capacitor are coupled to both an input and an output of the operational amplifier, and the second capacitor and the second resistor are coupled in series to the input of the operational amplifier.

9. A chip comprising:
a power grid to distribute a voltage; and
a resonance suppression circuit to suppress resonance on the power grid, the resonance suppression circuit comprising:
  a band-pass filter portion having an operational amplifier coupled between two signal lines of the power grid;
  a comparator portion, coupled to the band-pass filter portion, to receive signals passing through the band-pass filter portion, the comparator portion to sense voltage fluctuation at approximately a resonant frequency; and
  a current dissipation portion, coupled to the current dissipation portion, to clamp the voltage on the power grid based on the signals passing through the band-pass filter portion.

10. The chip of claim 9, further comprising an amplification portion coupled between the comparator portion and the current dissipation portion, the amplification portion to receive a trigger signal from the comparator portion and to delay a turning ON of the current dissipation portion.

11. The chip of claim 10, wherein the comparator portion and the amplification portion operate such that the current dissipation portion is OFF when there is substantially no noise on the power grid.

12. The chip of claim 9, wherein the current dissipation portion comprises a MOS transistor.

13. The chip of claim 9, wherein the band-pass filter portion comprises a resistor and a capacitor coupled in parallel with the operational amplifier such that the resistor and the capacitor are coupled to both an input of the operational amplifier and an output of the operational amplifier.

14. The chip of claim 9, wherein the band-pass filter portion comprises a resistor and a capacitor coupled in series to an input of the operational amplifier.

15. The chip of claim 9, wherein the band-pass filter portion comprises a first resistor, a second resistor, a first capacitor and a second capacitor, and a filter gain of the band-pass filter portion is based on a ratio of impedance of the first resistor and the first capacitor and an impedance of the second resistor and the second capacitor.

16. The chip of claim 15, wherein the first resistor and the first capacitor are coupled to both an input and an output of the operational amplifier, and the second capacitor and the second resistor are coupled in series to the input of the operational amplifier.

17. The chip of claim 9, wherein the band-pass filter portion is tolerant to process variations.

18. A system comprising:
a power supply to supply power; and
a chip coupled to the power supply to receive the power, the chip comprising:
  a power grid to distribute a voltage based on the received power; and
  a resonance suppression circuit including:
    a band-pass filter portion having an inverter coupled between two signal lines of the power grid, the band-pass filter portion including a first capacitor and a first resistor both coupled to an input and to an output of the inverter;
    a comparator portion, coupled to the band-pass filter portion, to receive signals passing through the band-pass filter portion, the comparator portion to sense voltage fluctuation at approximately a resonant frequency; and
    a current dissipation portion, coupled to the comparator portion, to clamp a voltage on the power grid based on signals passing through the band-pass filter portion.

19. The system of claim 18, wherein the band-pass filter portion comprises a second resistor and a second capacitor coupled in series with an input of the inverter.

* * * * *